(12) United States Patent
Smith

(10) Patent No.: US 7,360,778 B2
(45) Date of Patent: Apr. 22, 2008

(54) TRACTION DEVICE

(76) Inventor: Kim H. Smith, 1533 Kari Ann, Cedar Hill, TX (US) 75104

( * ) Notice: Subject to any disclaimer, the term of this patent is extended or adjusted under 35 U.S.C. 154(b) by 439 days.

(21) Appl. No.: 11/249,789

(22) Filed: Oct. 13, 2005

(65) Prior Publication Data

US 2007/0085293 A1 Apr. 19, 2007

(51) Int. Cl.
*B60G 7/00* (2006.01)
*B60G 11/00* (2006.01)

(52) U.S. Cl. .................. 280/124.17; 280/124.175; 267/260

(58) Field of Classification Search .......... 280/124.17, 280/124.172, 124.175, 124.176, 124.173; 267/39, 260, 47, 228, 229
See application file for complete search history.

(56) References Cited

U.S. PATENT DOCUMENTS

| | | | |
|---|---|---|---|
| 388,762 A | | 8/1888 | Coldren |
| 696,288 A | * | 3/1902 | White .................. 280/124.109 |
| 754,610 A | * | 3/1904 | Richards ..................... 280/788 |
| 1,970,859 A | | 8/1934 | Lenze |
| 2,162,479 A | | 6/1939 | Flickinger |
| 2,308,967 A | * | 1/1943 | Kuss ........................... 403/224 |
| 2,337,073 A | * | 12/1943 | Townsend ................... 267/262 |
| 3,309,107 A | | 3/1967 | Chieger |
| 3,388,762 A | | 6/1968 | Bausch |
| 3,499,660 A | | 3/1970 | Raidel |
| 3,695,605 A | | 10/1972 | Grossi |
| 4,098,523 A | | 7/1978 | Valero |
| 4,132,431 A | | 1/1979 | Von der Ohe |
| 4,141,428 A | * | 2/1979 | Loeb .......................... 180/349 |
| 4,175,772 A | | 11/1979 | Lampert |
| 4,282,945 A | | 8/1981 | Bessey |
| 4,614,359 A | | 9/1986 | Lundin et al. |
| 4,633,564 A | | 1/1987 | Sauber |
| 4,693,491 A | | 9/1987 | Akatsu et al. |
| 4,900,057 A | | 2/1990 | Raidel |
| 5,137,300 A | | 8/1992 | Walton |
| 5,354,092 A | | 10/1994 | Calvert |
| D369,333 S | | 4/1996 | Juarez |
| 5,632,504 A | | 5/1997 | Gallagher |
| 5,667,240 A | | 9/1997 | Mitchell |
| 6,019,384 A | * | 2/2000 | Finck .................... 280/124.17 |
| 6,386,565 B1 | | 5/2002 | Kugler |

(Continued)

FOREIGN PATENT DOCUMENTS

DE 3812924 A1 * 10/1989

(Continued)

*Primary Examiner*—Joe H. Cheng
*Assistant Examiner*—Nicole Verley
(74) *Attorney, Agent, or Firm*—James T. Robinson

(57) ABSTRACT

A traction device for a motor vehicle provides a rear support assembly positioned proximate to a rear axle and an adjacent portion of a leaf spring and a front rocker support assembly. The front rocker support assembly includes a front leaf spring bracket assembly attached to the front leaf spring eye, a pivot stop extending across the upper surface of the leaf spring at a predetermined distance rearward from the leaf spring eye for engaging an upper surface of the leaf spring to limit pivotal movement of the front rocker support assembly relative to the front end of the leaf spring, and a rocker pivotally attached to the front leaf spring bracket assembly. An adjustable rigid link extends between the rear support assembly and the front rocker support assembly.

18 Claims, 3 Drawing Sheets

U.S. PATENT DOCUMENTS

| | | |
|---|---|---|
| 6,416,067 B1 | 7/2002 | Kugler |
| 6,435,532 B2 * | 8/2002 | Hildebrand .......... 280/124.175 |
| 6,676,160 B2 * | 1/2004 | Stanley ....................... 280/797 |
| 7,229,088 B2 * | 6/2007 | Dudding et al. ....... 280/124.17 |

FOREIGN PATENT DOCUMENTS

DE 4026791 A1 * 8/1991

* cited by examiner

TRACTION DEVICE

BACKGROUND OF THE INVENTION

1. Background

This invention relates generally to suspension systems of high performance motor vehicles. More specifically but not by way of limitation, the present invention relates to a traction device for limiting wrap-up of a leaf spring during acceleration of a motor vehicle.

2. Discussion

Conventional leaf springs are widely used in rear-wheel drive vehicles. During acceleration, the leaf spring is subject to twisting forces which are opposite in direction to the acceleration of the drive wheels. The opposed twisting forces are commonly referred to as "wrap-up" and often contributes to rear wheel "hop".

In an effort to minimize leaf spring wrap-up and rear wheel "hop" on acceleration, a number of devices have been designed to minimize leaf spring wrap-up and rear-wheel hop during acceleration. One of these is a simple bolt-on traction bar. A rigid bar, generally of steel, has a mounting pad on one end for attachment to the point at which the rear axle meets the leaf spring assembly. A rubber "snubber" at the other end is used to attach the rigid bar to the front eye of the leaf spring. The length of the bar extends forward from the mounting pad to a point under the front leaf spring eye. During acceleration, the counter-rotation of the rear axle is arrested when the snubber meets the spring eye.

Bolt-on traction bars decrease leaf spring wrap-up, help to prevent rearwheel hop, and aid in improving rear wheel traction during acceleration. Additionally, the bolt-on traction bars are typically relatively inexpensive and easy to install.

Several other devices have been devised which represent improvements over the bolt-on traction bar. One such device is the ladder bar and another is the 4-link system. The ladder bar device comprises two mounting assemblies. One end of each mounting assembly is welded to the rear axle housing and the other is welded to a forward point of the chassis. These mounting assemblies are interconnected by a tubing structure. The 4-link system, which sometimes eliminates the conventional leaf spring from the motor vehicle, utilizes two 2-link assemblies (one on each side). One end of each 2-link assembly is welded to the rear axle housing and the other end is welded to a forward location on the chassis. Adjustable tubular links connect the rear axle housing to the chassis.

Each of these improved devices reduces leaf spring wrap-up and rear wheel hop, improves traction, and adjusts the instant center (the point at which the rear wheels push the vehicle forward). The ladder bar and the 4-link system, which are more expensive than simple bolt-on traction bars, require professional installation.

In U.S. Pat. No. 5,354,092 (Calvert), an improved traction bar includes a rear support assembly attached to the rear axle and the leaf spring and a front support assembly pivotally attached to the front end of the leaf spring. A rigid link extends between the rear support assembly and the front support assembly. The front support assembly is attached to the front of the leaf spring by a bushing which extends through the eye of leaf spring. The front support assembly includes a pivot stop which engages the upper surface of the leaf spring and limits movement of the front support assembly relative to the front end of the leaf spring. The pivotal movement limiting means includes means for engaging an upper surface of the leaf spring in the form of a pivot stop which extends across the upper surface of the leaf spring. The front support assembly includes a pair of generally triangular pivot plates which are pivotally attached to the front end of the leaf spring. The triangular pivot plates support the pivot stop at a fixed distance from the front end of the leaf spring and provide a point of attachment for the rigid link below the front end of the leaf spring. The pivot plates are secured to one another by three bolts positioned generally adjacent to the three corners of the triangular plates. The bolts serve to provide a pivot axis for the front support assembly relative to the front end of the leaf spring, the pivot stop itself, and the location of the point of attachment of the rigid link to the front support assembly. The rigid link is adjustable in length through the use of a threaded front eye connector and an oppositely threaded rear eye connector. Rotation of the rigid link thus changes the overall length of the rigid link.

While providing some improvement in leaf spring wrap-up, rear wheel hop, traction, and movement of the instant center forward with respect to the rear axle, the Calvert patent's effectiveness is limited by the structure of the front support assembly. The use of triangular pivot plates restrict the location of the pivot stop on the top surface of the leaf spring to a position comparatively close to the front eye of the leaf spring. Optional mounting apertures in the triangular pivot plates permit limited optional location of the threaded front eye connector of the rigid link, but additional adjustability is always helpful.

Accordingly, a need remains for a traction device for motor vehicles which is more effective in preventing leaf spring wrap-up and rear wheel hop by moving the vehicle instant center forward with respect to the rear axle and, simultaneously, improving traction during hard acceleration.

SUMMARY OF THE INVENTION

A traction device for a motor vehicle includes a rear support assembly positioned proximate to a rear axle and an adjacent portion of a leaf spring and a front rocker support assembly. The front rocker support assembly includes a front leaf spring bracket assembly attached to the front leaf spring eye, a pivot stop extending across the upper surface of the leaf spring at a predetermined distance rearward from the leaf spring eye for engaging an upper surface of the leaf spring to limit pivotal movement of the front rocker support assembly relative to the front end of the leaf spring, and a rocker pivotally attached to the front leaf spring bracket assembly. An adjustable rigid link extends between the rear support assembly and the front rocker.

DETAILED DESCRIPTION

In the following description of the of the present invention, like numerals and characters designate like elements throughout the figures of the drawings.

Figure 1:
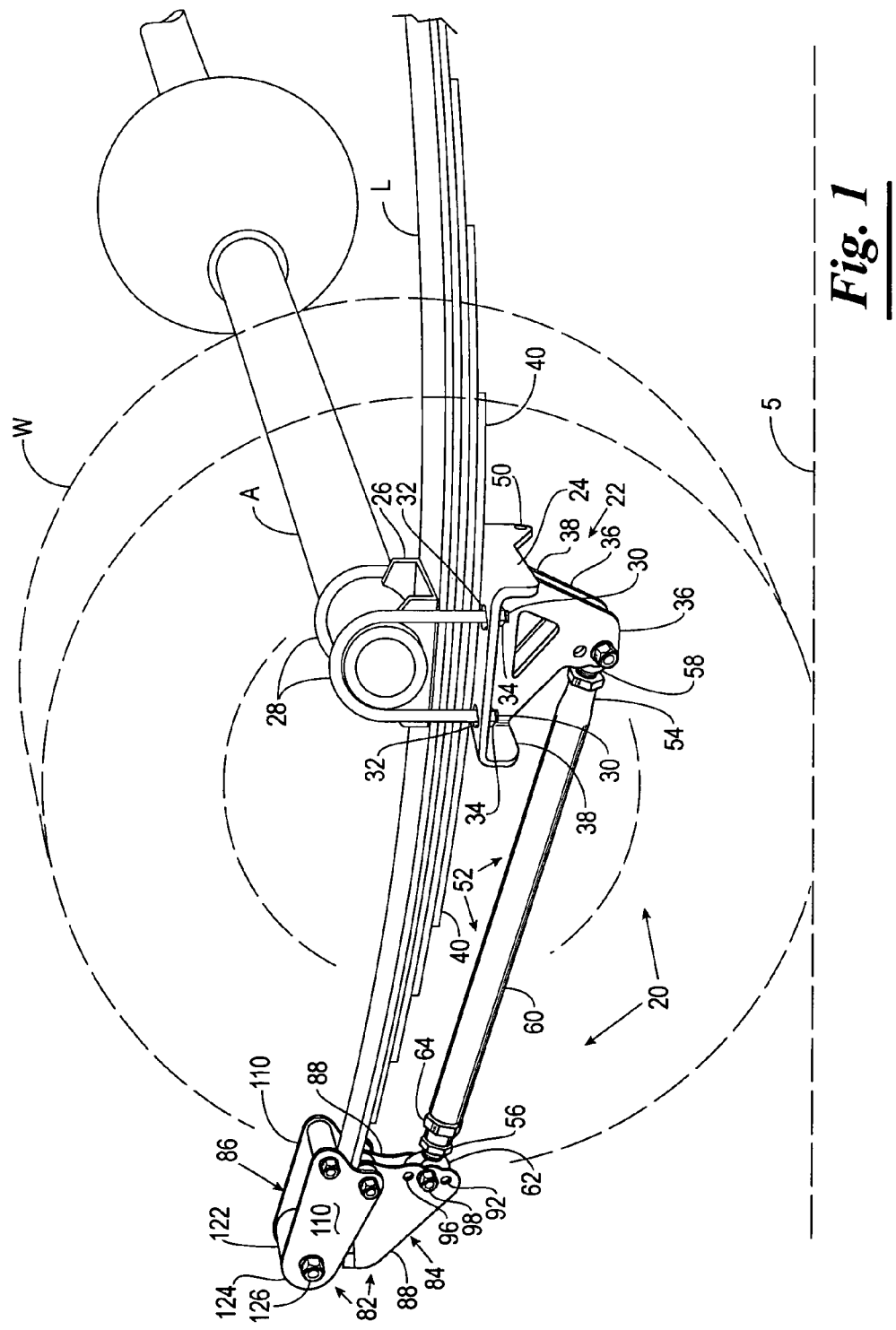
FIG. 1 shows the traction device according to the present invention adjacent to a leaf spring supporting a rear axle of a motor vehicle.
Figure 2:
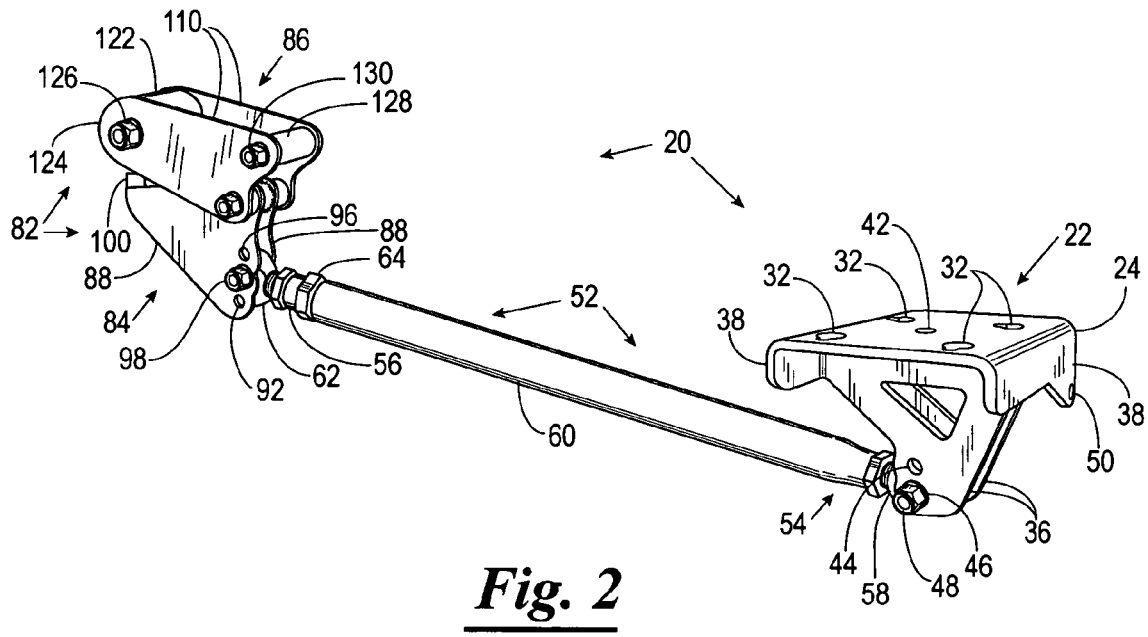
FIG. 2 is another view of the traction device shown in FIG. 1.

Referring generally to FIGS. 1-2, an improved traction device 20 works is attached to a standard leaf spring L and a rear axle A. The rear axle A supports a wheel W in contact with a road surface S. The leaf spring L includes a rear leaf spring mount R (not shown) supported by the motor vehicle chassis and a front leaf spring eye E (not shown) supported by a front leaf spring mount F (not shown) attached to the motor vehicle chassis. It will be appreciated by one skilled in the art that the standard leaf spring L, the rear axle A, the wheel W, the rear leaf spring mount R, the front leaf spring eye E, the front leaf spring mount F, and the motor vehicle chassis are typical and, therefore, no illustration is necessary.

Still referring to FIGS. 1-2, the traction device 20 includes a rear support assembly 22, a rigid link assembly 52, and a front rocker support assembly 82. Referring now to the rear support assembly 22, a flanged bracket 24 cooperates with a leaf spring axle bracket 26 to receive the leaf spring L therebetween. U-bolts 28 encircle the axle A. Threaded ends 30 of the U-bolts 28 extend through apertures 32 in the flanged bracket 24. The U-bolts 28 are held in place by nuts 34. Parallel tabs 36 project downwardly from the flanged bracket 24. The flanged bracket 24 includes at least four apertures 32 through which the U-bolts 28 extend. Front and rear flanges 38 at the forward and rearward edges of the flanged bracket 24 extend downwardly away from the leaf spring lower surface 40. A fifth aperture 42 (See FIG. 2) may be provided in the flanged bracket 24 for the leaf spring bolt, if necessary. The parallel tabs 36 are generally triangular in shape and include two pairs of aligned apertures 44-44 and 46-46 at their lower ends for receiving a nut-bolt assembly 48 to secure a rear end 54 of the rigid link assembly 52 therein. Apertures 50 (only one shown) in the front and rear flanges 38 provide a convenient mounting location for a shock absorber (not shown).

Regarding the rear support assembly 22 shown in FIGS. 1-2, it will be understood by one skilled in the art that the rear support assembly 22 described herein is a modification of a support assembly well known in the art. The present improved traction device according to applicant's invention includes optional aligned apertures 44-44 and 46-46 in the downwardly extending tabs 36 for attachment of the rear end 54 of the rigid link assembly 52. The second pair of aligned apertures provides further flexibility and adjustability in implementation of the traction device 20 according to applicant's invention.

Referring again to FIGS. 1-2, the rigid link assembly 52 has a rear end portion 54 attached to the rear support assembly 22 and a front end portion 56 attached to the front rocker support assembly 82. A rear eye connector 58 is threaded into a rigid bar 60 at the rear end 54 of the rigid link assembly 52, and a front eye connector 62 is threaded into the rigid bar at the front end portion 56 of the rigid link assembly 52. The rigid bar 60 is typically constructed by welding internally oppositely threaded front and rear inserts into the ends of a rigid bar. Oppositely internally threaded ends of the rigid bar 60 permit the rigid bar to be operated like a turnbuckle. i.e., the rigid bar 60 can be turned one direction to increase the distance between the eye portions of the eye connectors 58, 62 or the rigid bar 60 can be turned the opposite direction to shorten the distance between the eye portions of the eye connectors 58, 62. An external hex fitting 64 is provided to permit easy adjustment of the rigid bar 60.

Regarding the rigid link assembly 52, it will be understood that the rigid link assembly 52 described herein is well known in the art. A rotatable bushing is typically deployed within the eye of the eye connectors 58, 62. Because the implementation of the rigid link assembly 52 shown herein is well known to persons skilled in the art, the rigid link assembly 52 will not be described in great detail.

Figure 3:
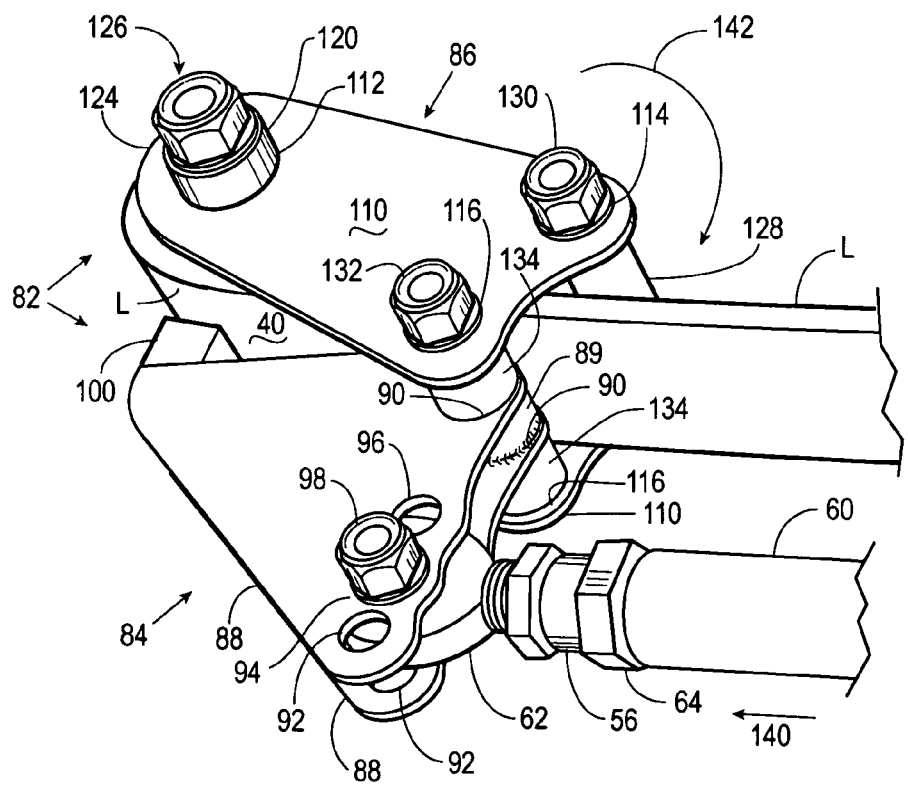
FIG. 3 is a view of the front rocker assembly of the traction device shown in FIGS. 1-2 with the rear portion cut away.

Referring now to FIGS. 1-2 in conjunction with FIG. 3, the front rocker support assembly 82 includes a rocker 84 pivotally attached to a front leaf spring bracket subassembly 86. The rocker 84 is formed by a pair of identical, generally triangular plates 88 welded in parallel relationship to a cylindrical rocker pivot member 89. The rocker 84 has a pair of aligned pivot bolt apertures 90-90 near one corner of each of the triangular plates 88. The rocker 84 also has three pairs of aligned link positioning apertures 92-92, 94-94, and 96-96 along a side common with the pivot bolt apertures 90-90. The aligned link position apertures 92-92 are positioned in a downwardly extending second corner of the parallel triangular plates 88. The pairs of aligned link positioning apertures 94-94 and 96-96 are spaced between the pivot bolt apertures 90-90 and the distal link position apertures 92-92. In FIGS. 1-3, the front eye connector 62 of the rigid link assembly 52 is attached to the rocker 84 by a nut-bolt assembly 98 disposed through the eye of the eye connector 62 and aligned positioning link apertures 94-94. The rocker 84 further includes a transverse rocker head 100 located at the third corner of the parallel triangular plates 88.

Still referring to FIGS. 1-3, the front leaf spring bracket subassembly 86 includes two identical substantially parallel elongated plates 110 having three pairs of aligned apertures. Aligned apertures 112-112 are located at one end of the elongated parallel plates 110. Aligned pivot stop apertures 114-114 are located distal from the leaf spring eye apertures 112-112. Rocker pivot bolt apertures 116-116 are located between the leaf spring eye apertures 112-112 and the pivot stop apertures 114-114. A leaf spring bushing insert 120 disposed within the aligned leaf spring eye apertures 112-112 supports a leaf spring bushing 122 inserted into the front leaf spring eye E of the leaf spring L.

In use, the front leaf spring bracket subassembly 86 encloses the front leaf spring eye E and the leaf spring bushing 122 between ends 124 of the elongated parallel plates 110. The front leaf spring eye E is supported by the leaf spring bushing 122 which is, in turn, supported by the leaf spring bushing insert 120. The ends of the elongated parallel plates 110 and the front leaf spring eye E contained therebetween are attached to the mating front leaf spring mount F (not shown) on the vehicle chassis. The front leaf spring bracket assembly is secured to the front leaf spring mount F by a nut-bolt combination 126.

Still referring to FIGS. 1-3, a pivot stop 128 is disposed within the aligned apertures 114-114 and secured in place by a nut-bolt combination 130. Although the pivot stop 128 shown in FIGS. 1-3 is a cylindrical metal sleeve, it will be understood by one skilled in the art that the pivot stop 128 could also be a welded bar.

Still referring to FIGS. 1-3, the front leaf spring bracket subassembly 86 is attached to the rocker 84 by a rocker pivot bolt nut-bolt combination 132 disposed simultaneously through aligned apertures 116-116 in the elongated parallel plates 110, the cylindrical rocker pivot member 89 in the rocker 84, the aligned apertures 90-90 in the plates 88, and cylindrical spacers 134.

Referring now to FIG. 3, when properly installed, the elongated parallel plates 110 bracket the front end of the leaf spring L and position the pivot stop 128 adjacent the upper surface 40 of the leaf spring L at a predetermined distance from the front leaf spring eye E. During acceleration, force is directed along arrow 140. The force directed along arrow 140 is transferred through the rocker 84 to the front leaf spring bracket subassembly 86. The front leaf spring bracket subassembly 86 rotates on the rocker pivot bolt-nut combination 132 so the pivot stop 128 moves along arrow 142 and the force which was originally directed along 140 is now applied to the surface of the leaf spring L.

Referring again to FIGS. 1-3, the aligned apertures 114-114 for the pivot stop 128 and the bolt-nut combination 130 are positioned generally rearward with respect to the rocker pivot bolt-nut combination 132. It will be understood by one skilled in the art that, as the force originally applied along the arrow 140 is applied farther to the rear with respect to the front leaf spring eye E, greater benefit will be derived from the traction device of the present invention.

During installation of the traction device 20 of the present invention, it is possible to pre-load either wheel W by initially adjusting the front rocker support assembly 82 so the pivot stop 128 bears downwardly on the upper surface 40 of the leaf spring L while the vehicle is stopped. Moreover, selective adjustment of left and right traction devices can adjust for traction differences between the left wheel and the right wheel of a vehicle.

Figure 4:
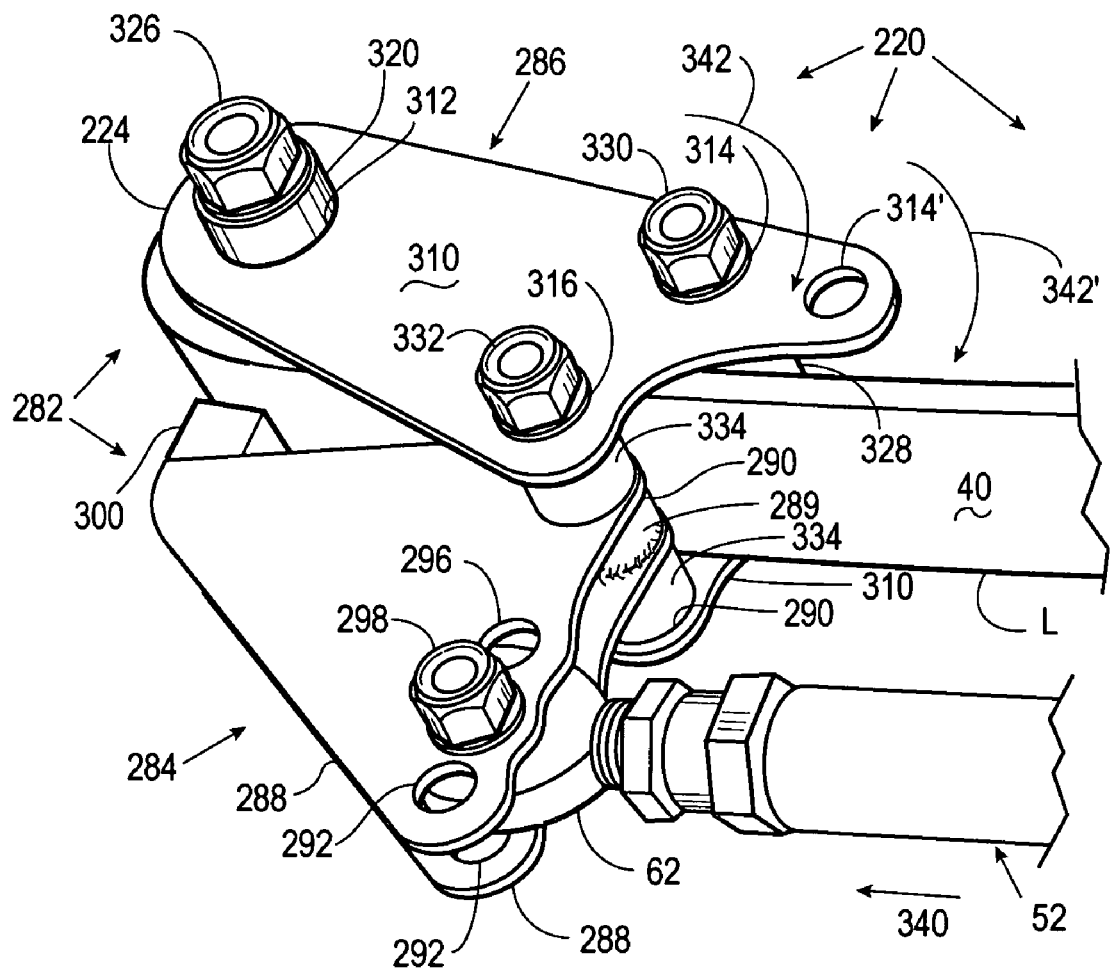
FIG. 4 is a view of another traction device according to applicant's invention.

Referring now to FIG. 4, shown therein is another traction device 220 according to the present invention. The traction device 220 has a front rocker support assembly 282 which differs from the front rocker support assembly 82 of the traction device 20 shown in FIGS. 1-3. Otherwise, the structure of the traction device 220 (cut away) is the same as that of the traction device 20. the front rocker support assembly 282 includes a rocker 284 pivotally attached to a front leaf spring bracket subassembly 286. The rocker 284 is formed by a pair of identical, generally triangular plates 288 welded in parallel relationship to a cylindrical rocker pivot member 289. The rocker 284 has a pair of aligned pivot bolt apertures 290-290 near one corner of each of the triangular plates 288. The rocker 284 also has three pairs of aligned link positioning apertures 292-292, 294-294, and 296-296 along a side common with the pivot bolt apertures 290-290. The aligned link position apertures 292-292 are positioned in a downwardly extending second corner of the parallel plates 288. The pairs of aligned link positioning apertures 294-294 and 296-296 are spaced between the pivot bolt apertures 290-290 and the distal link position apertures 292-292.

Still referring to FIG. 4, the front eye connector 62 of the rigid link assembly 52 is attached to the rocker 284 by a nut-bolt assembly 298 disposed through the eye of the eye connector 262 and aligned positioning link apertures 294-294. The rocker 284 further includes a transverse rocker head 300 located at the third corner of the parallel triangular plates 288. The front leaf spring bracket subassembly 286 includes two identical elongated parallel plates 310 having three pairs of aligned apertures. Aligned apertures 312-312 are located at one end of the elongated parallel plates 310. Two pairs of aligned pivot stop apertures 314-314 and 314'-314' are located distal from the leaf spring eye apertures 312-312. Rocker pivot bolt apertures 316-316 are located between the leaf spring eye apertures 312-312 and the pivot stop apertures 314-314. A leaf spring bushing insert 320 disposed within the aligned leaf spring eye apertures 312-312 supports a leaf spring bushing 322 (not visible in FIG. 4; see FIGS. 1-2) inserted into the front leaf spring eye E of the leaf spring L.

In use, the front leaf spring bracket subassembly 286 encloses the front leaf spring eye E and the leaf spring bushing 322 between ends 324 of the elongated parallel plates 310. The front leaf spring eye E is supported by the leaf spring bushing 322 which is, in turn, supported by the leaf spring bushing insert 320. The ends of the elongated parallel plates 310 and the front leaf spring eye E contained therebetween are attached to the mating front leaf spring mount F (not shown) on the vehicle chassis. The front leaf spring bracket assembly is secured to the front leaf spring mount F by a nut-bolt combination 326.

Still referring to FIG. 4, a pivot stop 328 is disposed within the aligned apertures 314-314 and secured in place by a nut-bolt combination 330. Although the pivot stop 328 shown in FIG. 4 is a cylindrical metal sleeve, it will be understood by one skilled in the art that the pivot stop 328 could also be a welded bar.

Still referring to FIG. 4, the front leaf spring bracket subassembly 286 is attached to the rocker 284 by a rocker pivot bolt nut-bolt combination 332 disposed simultaneously through aligned apertures 316-316 in the elongated parallel plates 310, the cylindrical rocker pivot member 289 in the rocker 284, the aligned apertures 290-290 in the generally triangular plates 288, and cylindrical spacers 334.

Referring now to FIG. 4, when properly installed, the elongated parallel plates 310 bracket the front end of the leaf spring L and position the pivot stop 328 adjacent the upper surface 40 of the leaf spring L at a predetermined distance from the front leaf spring eye E. During acceleration, force is directed along arrow 340. The force directed along arrow 340 is transferred through the rocker 284 to the front leaf spring bracket subassembly 286. The front leaf spring bracket subassembly 286 rotates on the rocker pivot bolt-nut combination 332 so the pivot stop 328 moves along arrow 342 and the force which was originally directed along 340 is now applied to the surface of the leaf spring L.

The pivot stop 328 can optionally be located in a aligned apertures 314' in the elongated parallel plates 310 so the pivot stop moves along arrow 342' to apply the force originally directed along 340 to the surface of the leaf spring L at a point still farther to the rear.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A traction device for a motor vehicle, comprising:
   a rear support assembly positioned proximate to a rear axle and an adjacent portion of a leaf spring, wherein the leaf spring is further characterized as having a front leaf spring eye;
   rear support attachment means for attaching a rigid link to the rear support assembly;
   a front rocker support assembly attached to the front leaf spring eye of the leaf spring, the front rocker support assembly further comprising:
      a front leaf spring bracket assembly attached to the front leaf spring eye;
      a pivot stop extending across the upper surface of the leaf spring at a predetermined distance rearward from the leaf spring eye for engaging an upper surface of the leaf spring to limit pivotal movement of the front rocker support assembly relative to the front end of the leaf spring, wherein the pivot stop is supported by a pair of facing elongated plates pivotally attached to the front end of the leaf spring;
      a rocker pivotally attached to the front leaf spring bracket assembly; and
      rocker attachment means for attaching a rigid link to the rocker; and
   a rigid link extending between the rear support attachment means and the rocker attachment means.

2. A traction device as set forth in claim 1, wherein the rear support assembly includes a flanged bracket bolted in place adjacent to the leaf spring opposite to the rear axle.

3. A traction device as set forth in claim 2, wherein the rear support assembly includes a rear mount bracket which extends downwardly from the flanged bracket, wherein the rear mount bracket provides, at its lower end, attachment means for connecting a rear end of the rigid link to the rear support assembly.

4. A traction device as set forth in claim 3, wherein the rear support assembly includes a pair of rear mount brackets, wherein the rear end of the rigid link is bolted in place between lower ends of the rear mount brackets.

5. A traction device as set forth in claim 1, wherein the elongated plates define the spaced location of the attachment means from the front end of the leaf spring, below the front end of the leaf spring.

6. A traction device as set forth in claim 1, wherein the rigid link includes means for adjusting the length thereof.

7. A traction device as set forth in claim 6, wherein the rigid link includes an elongated bar having a front eye connector threaded into a front end of the elongated bar, and a rear eye connector threaded into a rear end of the elongated bar.

8. A traction device as set forth in claim 7, wherein the front eye connector is bolted to the attachment means of the front support assembly, and wherein the rear eye connector is bolted to the rear support assembly.

9. A traction device as set forth in claim 7, wherein the front and rear eye connectors are threaded oppositely into the elongated bar such that rotation of the elongated bar about its longitudinal axis changes the overall length of the rigid link.

10. A traction device as set forth in claim 1, wherein the substantially parallel elongated plates of the front leaf spring bracket subassembly includes alternate locations for the pivot stop.

11. A traction device for limiting wrap-up of a leaf spring on acceleration of a motor vehicle, the traction device comprising:
  a rear support assembly positioned proximate a rear axle, including a flanged bracket bolted in place adjacent the leaf spring opposite the rear axle, and a rear mount bracket extending downwardly from a flanged bracket, the rear mount bracket providing, at its lower end, attachment means for connecting another member to the rear support assembly;
  a front rocker support assembly attached to a front leaf spring eye of the leaf spring, the front rocker support assembly further comprising:
    a front leaf spring bracket assembly attached to the front leaf spring eye;
    a pivot stop extending across the upper surface of the leaf spring at a predetermined distance rearward from the leaf spring eye for engaging an upper surface of the leaf spring to limit pivotal movement of the front rocker support assembly relative to the front end of the leaf spring, wherein the pivot stop is supported by a pair of facing elongated plates pivotally attached to the front end of the leaf spring;
    a rocker pivotally attached to the front leaf spring bracket assembly; and
    rocker attachment means for attaching a rigid link to the rocker; and
  a rigid link extending between the attachment means of the rear support assembly and the attachment means of the front support assembly.

12. A traction device as set forth in claim 11, wherein the rear support assembly includes a pair of rear mount brackets, wherein a rear end of the rigid link is bolted in place between lower ends of the rear mount brackets, and a mount for receiving a lower end of a shock absorber.

13. A traction device as set forth in claim 11, wherein the substantially parallel elongated plates define the spaced location of the attachment means from the front end of the leaf spring, below the front end of the leaf spring.

14. A traction device as set forth in claim 11, wherein the rigid link includes means for adjusting the length thereof.

15. A traction device as set forth in claim 14, wherein the rigid link includes an elongated bar having a front eye connector threaded into a front end of the elongated bar, and a rear eye connector threaded into a rear end of the elongated bar, the front eye connector is bolted to the attachment means of the front support assembly and the rear eye connector is bolted to the attachment means of the rear support assembly, and wherein the front and rear eye connectors are threaded oppositely into the elongated bar such that rotation of the elongated bar about its longitudinal axis changes the overall length of the rigid link.

16. A traction device as set forth in claim 11, wherein the substantially parallel elongated plates of the front leaf spring bracket subassembly includes alternate locations for the pivot stop.

17. A traction device for limiting wrap-up of a leaf spring on acceleration of a motor vehicle, comprising:
  a rear support assembly positioned proximate to a rear axle, including a flanged bracket bolted adjacent to the leaf spring opposite to the rear axle, and a pair of rear mount brackets extending downwardly from the flanged bracket to provide, at their lower ends, attachment means for connecting another member to the rear support assembly;
  a front rocker support assembly attached to the front leaf spring eye of the leaf spring, the front rocker support assembly further comprising:
    a front leaf spring bracket assembly attached to the front leaf spring eye;
    a pivot stop extending across the upper surface of the leaf spring at a predetermined distance rearward from the leaf spring eye for engaging an upper surface of the leaf spring to limit pivotal movement of the front rocker support assembly relative to the front end of the leaf spring, wherein the pivot stop is supported by a pair of facing elongated plates pivotally attached to the front end of the leaf spring;
    a rocker pivotally attached to the front leaf spring bracket assembly; and
    rocker attachment means for attaching a rigid link to the rocker; and
  a rigid link extending between the attachment means of the rear support assembly and the attachment means of the rocker, including an elongated bar having a front eye connector threaded into a front end of the elongated bar, and a rear eye connector threaded into a rear end of the elongated bar, wherein the front and rear eye connectors are threaded oppositely into the elongated bar such that rotation of the elongated bar about its longitudinal axis changes the overall length of the rigid link.

18. A traction device as set forth in claim 17, wherein the substantially parallel elongated plates of the front leaf spring bracket subassembly includes alternate locations for the pivot stop.

* * * * *